United States Patent [19]

Nickel

[11] Patent Number: 5,664,329
[45] Date of Patent: Sep. 9, 1997

[54] METHOD FOR FABRICATING A ONE-PIECE METAL VEHICLE WHEEL

[75] Inventor: Harald P. Nickel, Cedar Falls, Iowa

[73] Assignee: Cosma International Inc., Concord, Canada

[21] Appl. No.: 564,939

[22] Filed: Nov. 30, 1995

[51] Int. Cl.⁶ ..................................................... B21K 1/32
[52] U.S. Cl. .................... 29/894.324; 301/64.3; 29/894.353
[58] Field of Search ............ 29/894.324, 894.325, 29/894.353; 301/63.1, 64.2, 64.3, 95

[56] References Cited

U.S. PATENT DOCUMENTS

| | | | |
|---|---|---|---|
| 1,566,017 | 12/1925 | Jones | 301/64.3 |
| 2,075,294 | 3/1937 | Le Jeune . | |
| 3,129,496 | 4/1964 | Cox . | |

FOREIGN PATENT DOCUMENTS

| | | | |
|---|---|---|---|
| 148066 | 7/1985 | European Pat. Off. | 29/894.324 |
| 61-172636 | 8/1986 | Japan . | |
| 406186 | 2/1934 | United Kingdom . | |
| 466393 | 5/1937 | United Kingdom | 301/63.1 |

Primary Examiner—P. W. Echols

Attorney, Agent, or Firm—Cushman Darby & Cushman IP Group of Pillsbury Madison & Sutro LLP

[57] ABSTRACT

An improved method for fabricating a vehicle wheel from a one-piece sheet metal blank involves a nine station transfer die. In a first station, a sheet metal blank is drawn into a dish-shaped wall, a cylindrical outside wall, a first contour, and a first side wall. In the second station, the dish-shaped wall is reverse drawn to form a hub and an inside wall, and a valve hole is punched into the first contour. In the third station, the hub is flattened to be substantially perpendicular to an axial centerline of the partially fabricated wheel, and an outer peripheral edge of the first side wall is trimmed. In the fourth station, the inside wall is laterally formed so as to be in contact with the outside wall, and an outer peripheral edge of the first side wall is wiped over to form a flange. In the fifth station, a second contour is laterally formed. In the sixth station, a first offset and inner and outer hub-stiffening embosses are drawn into the hub. In the seventh station, a second offset is drawn in the hub, and a second side wall is laterally formed to complete a tire engaging rim. In the eighth station a center aperture and a plurality of wheel mounting holes are punched in the hub. Finally, in the ninth station, the center aperture and the wheel mounting holes are extruded, and a plurality of rim-stiffening embosses are laterally formed in the rim.

22 Claims, 8 Drawing Sheets

1

METHOD FOR FABRICATING A ONE-PIECE METAL VEHICLE WHEEL

BACKGROUND OF THE INVENTION

1. Field of the Invention

The present invention relates to an improved method for fabricating a vehicle wheel constructed as a one-piece part from sheet metal and to a one-piece metal vehicle wheel constructed by the improved method.

2. State of the Prior Art

Vehicle wheels to be mounted on a vehicle and for supporting a tire thereon are usually made of metal. The fabrication of such metal wheels typically involves multiple components and multiple shaping and connecting operations. For example, a typical process presently employed to manufacture a metal wheel involves at least the following steps: Rolling an elongated rectangular piece of metal to form a rim; welding the ends of the rolled rectangular piece of metal to form a continuous cylindrical rim; cleaning the welded area; sizing the substantially cylindrical rim to its finished dimensions; separately fabricating an inside hub member and connecting, as by welding, the inside hub member to the interior of the rim.

A vehicle wheel fabricated from a single piece of metal requires less material to construct and is substantially simpler to fabricate as there are fewer parts to construct and there are no connecting steps involved, thus resulting in cost savings. In addition, one-piece construction eliminates stress concentrations, which can be associated with connections between non-integral components.

Vehicle wheels fabricated from a single piece of metal are known in the art. For example, U.S. Pat. No. 2,075,294 discloses a method of forming both the hub and rim of a vehicle wheel from a single forged or cast metal blank. The process involves a number of successive steps, such as forging, rolling, and forming steps, for producing a one-piece vehicle wheel.

U.S. Pat. No. 3,129,496 also discloses a manufacturing method for producing a wheel, including the rim and the hub portion thereof, from a single cylindrical blank. The cylindrical blank is constructed from an elongated rectangular piece which is rolled into a substantially cylindrical form, and the ends thereof are then welded together. The cylindrical blank is then formed into a wheel by a series of sequential steps, which include a roll extrusion step and a series of horizontal and vertical linear stroke die forming steps. Because this process involves at least one welding operation, however, the full advantages of a true one-piece construction are not realized.

Finally, British Patent 406,186 discloses a metal wheel formed from a single piece of sheet metal by a series of linear stamping operations, and Japanese Patent Application No. 60-13327 discloses a metal wheel formed from a single piece of sheet metal by a series of stamping and rolling operations.

While methods for fabricating one-piece metal vehicle wheels are known, there nevertheless remains the constant need and challenge to improve the strength, reliability, and cost effectiveness of a one-piece metal vehicle wheel while at the same time reducing the weight thereof and simplifying the fabrication thereof.

SUMMARY OF THE INVENTION

It is an object of the present invention to provide an improved method for fabricating a one-piece metal vehicle wheel which meets the aforementioned needs and challenges. Specifically provided is a method of forming a metal, one-piece vehicle wheel for supporting a tire thereon, the wheel having an axial centerline, a rim for mounting radially inward edges of the tire, and a hub for supporting the wheel on a vehicle, the method comprising: providing a sheet metal blank; shaping the blank in a first axial direction to construct a dish-shaped wall and to construct an outside wall and a first side wall of the rim for supporting the radially inward edge of the tire to be mounted, the outside wall including an axial portion generally parallel to the axial centerline and a first contour portion extending from the axial portion of the outside wall to the first side wall; shaping a central portion of the dish-shaped wall in a second axial direction to construct the hub in a generally domed shape and to fold an annular, radially outward portion of the dish-shaped wall inside the outside wall to construct an inside wall in surrounding relation to the hub; piercing a valve hole in the first contour portion, the valve hole being constructed and arranged to receive a tire valve stem; shaping the inside wall radially outwardly toward the axial portion of the outside wall, flattening the hub, and trimming an outer peripheral portion of the first side wall; shaping the inside wall so that an extent of the inside wall is parallel to and in contact with the axial portion of the outside wall to construct a double walled axial portion and shaping an outer peripheral edge of the first side wall to construct a first side wall stiffening flange; shaping a portion of the double walled axial portion radially outwardly to construct a second contour portion of the rim; shaping a portion of the hub in the first axial direction to construct a first offset constructed an arranged to stiffen the hub and shaping a plurality of hub-stiffening embosses in the hub, the plurality of hub-stiffening embosses being circumferentially spaced and radially arranged in surrounding relation to the centerline of the wheel; shaping the first offset in the second axial direction to construct a second offset constructed and arranged to further stiffen the hub, shaping a portion of the second contour to construct a second side wall for supporting the radially inward edge of the tire to be mounted, and reshaping the first offset and the plurality of hub-stiffening embosses to ensure that the first offset and the plurality of hub-stiffening embosses are sized correctly; piercing a center hole and a plurality of wheel mounting holes surrounding the center hole in the hub; and shaping a plurality of rim-stiffening embosses in the rim and shaping the center hole and each of the plurality of wheel mounting holes to construct a center hole flange for the center hole and a wheel mounting hole flange for each of the plurality of wheel mounting holes.

These and other objects of the present invention will become more apparent during the course of the following detailed description and appended claims. The invention may best be understood with reference to the accompanying drawings wherein an illustrative embodiment is shown.

DETAILED DESCRIPTION OF THE PRESENTLY PREFERRED EXEMPLARY EMBODIMENT

Figure 1:
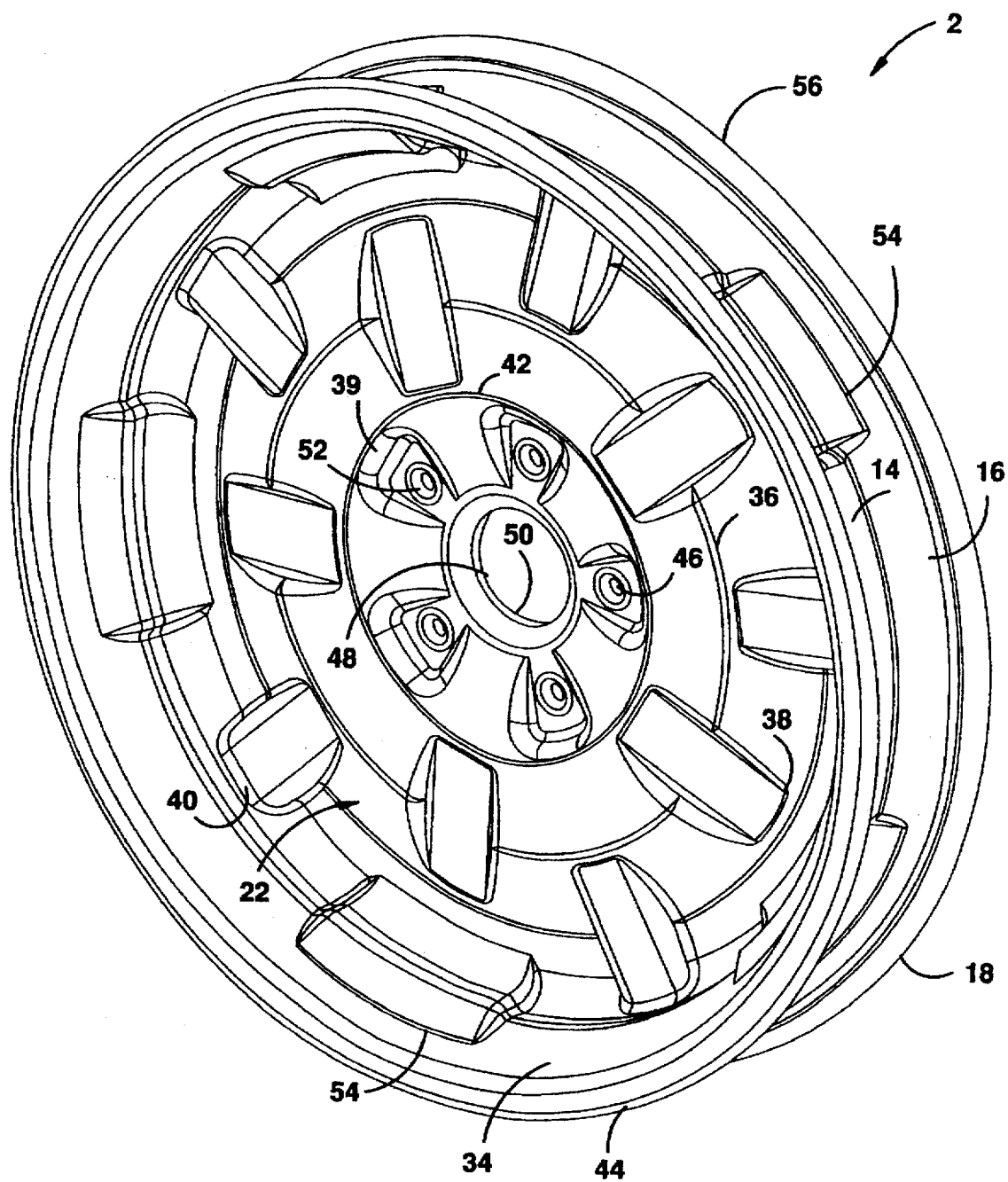
FIG. 1 is an isometric view of a one piece metal vehicle wheel constructed in accordance with the improved method of the present invention.
Figure 2:
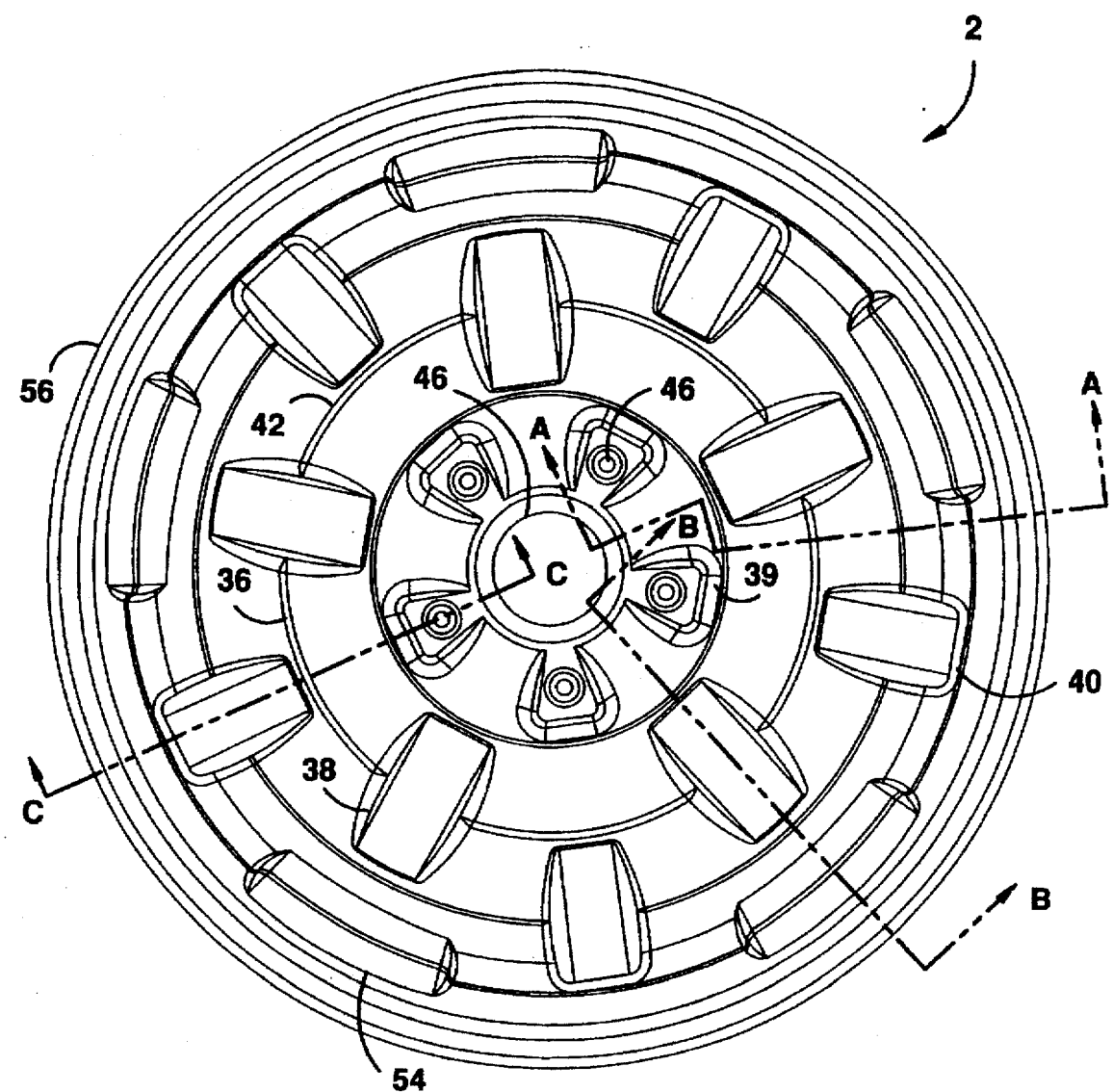
FIG. 2 is a plan view of the one piece metal vehicle wheel shown in FIG. 1.
Figure 2A:
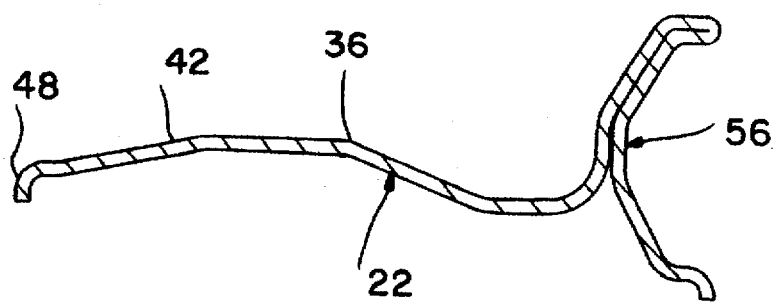
FIG. 2A is a half sectional view of the one piece vehicle wheel of FIG. 2 taken along the line A—A.
Figure 2B:
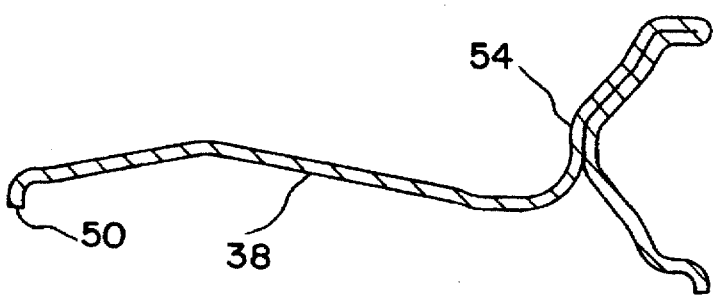
FIG. 2B is a half sectional view of the one piece vehicle wheel of FIG. 2 along the direction indicated by line B—B.
Figure 2C:
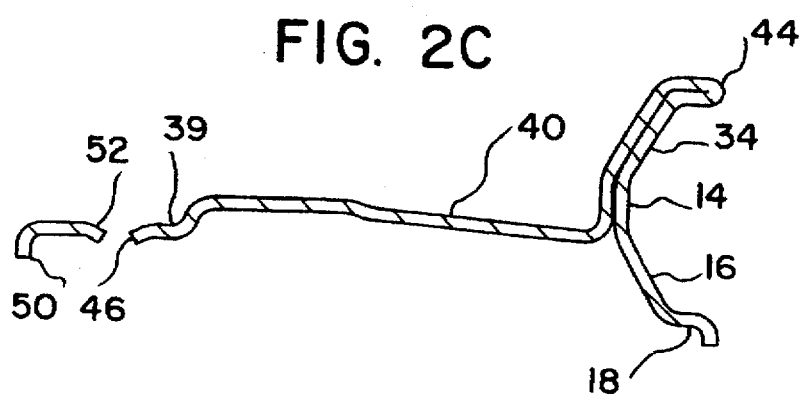
FIG. 2C is a half sectional view of the one piece vehicle wheel of FIG. 2 along the direction indicated by line C—C.

A one piece metal vehicle wheel constructed by the improved method of the present invention is designated by reference no. 2 in FIGS. 1 and 2. The wheel 2 comprises a substantially circular rim 56 extending ground the periphery of the wheel. The rim 56 includes an axial portion 14, centered axially on the rim and being substantially parallel to a centerline of the wheel 2. As shown in FIG. 2C, the rim 56 further includes a first contour portion 16 protruding at an angle radially away from the axial portion 14 and an annular first sidewall 18 extending generally axially from the centerline of the wheel 2 for engaging one radially inward edge of a tire (not shown) to be mounted on the wheel. The rim 56 further includes a second contour portion 34 protruding at an angle radially away from the axial portion 14 and a second side wall 44 for engaging the other radially inward edge of a tire to be mounted on the wheel.

The rim 56 also includes a plurality of circumferentially spaced, radially arranged rim stiffening embosses 54. Each of the rim stiffening embosses 54 is axially centered within the rim 56 and serves to rigidify the rim 56.

The wheel 2 further includes a hub portion 22 located radially inwardly from the rim 56. The hub 22 has formed therein a generally circular first offset portion 36 that is bent or otherwise shaped out of the plane of the hub 22 so as to provide radial stiffness for the hub. The hub 22 further includes a generally circular second offset 42 located radially inwardly of the first offset 36. The second offset 42 is formed in a plane different from that of the hub 22 and the first offset 36 and provides additional radial stiffness for the hub 22.

The hub 22 also has formed therein a plurality of inner hub stiffening embosses 38 circumferentially spaced and radially arranged about the centerline of the wheel 2. Also provided are a plurality of outer hub stiffening embosses 40 circumferentially spaced and radially arranged about the centerline of the wheel 2. As shown in FIGS. 1–2C, the outer hub stiffening embosses 40 are disposed radially outwardly from the inner hub stiffening embosses 38. The inner hub stiffening embosses 38 and the outer hub stiffening embosses 40 provide additional radial, axial, and torsional stiffness for the rim 22.

Formed within the second offset 42 are a plurality of circumferentially spaced sockets 39, which are radially arranged about the centerline of the wheel 2. Formed within each socket 39 is a wheel mounting hole 46 for fixing the wheel to the axle of a vehicle, as by a bolt (not shown). Around the periphery of each wheel mounting hole 46 is a wheel mounting hole flange 52. The wheel mounting hole flange 52 serves to stiffen the wheel mounting hole 46 and further serves as a bolt centering surface which engages a mating frusto-conical surface beneath the head of a mounting bolt (not shown).

A center aperture 48 is formed at the radial center of the hub 22. The center aperture 48 includes an aperture stiffening flange 50 for stiffening the center aperture 48.

The present method for fabricating a one-piece metal vehicle wheel preferably comprises a nine station transfer die in which are performed a series of metal shaping operations, such as drawing, forming, and punching operations. The nine preferred stations in their preferred sequence are shown in FIGS. 3–11, each of which show a cross-section of a vehicle wheel in various stages of the fabrication process. Because the vehicle wheel is symmetrical about an axial centerline thereof, only a half sectional view is shown.

Throughout this detailed description, reference is made to the tools and dies that perform the various shaping, i.e., forming and drawing, operations. Because the tooling used in each of the shaping operations are conventional devices which are well known in the metal stamping/forming arts, the tools and dies themselves are not shown in the figures. Furthermore, by not showing the conventional tooling involved in the shaping operations, it is possible to show, by use of phantom lines, before-and-after views of the partially fabricated wheel in the particular station.

Figure 3:
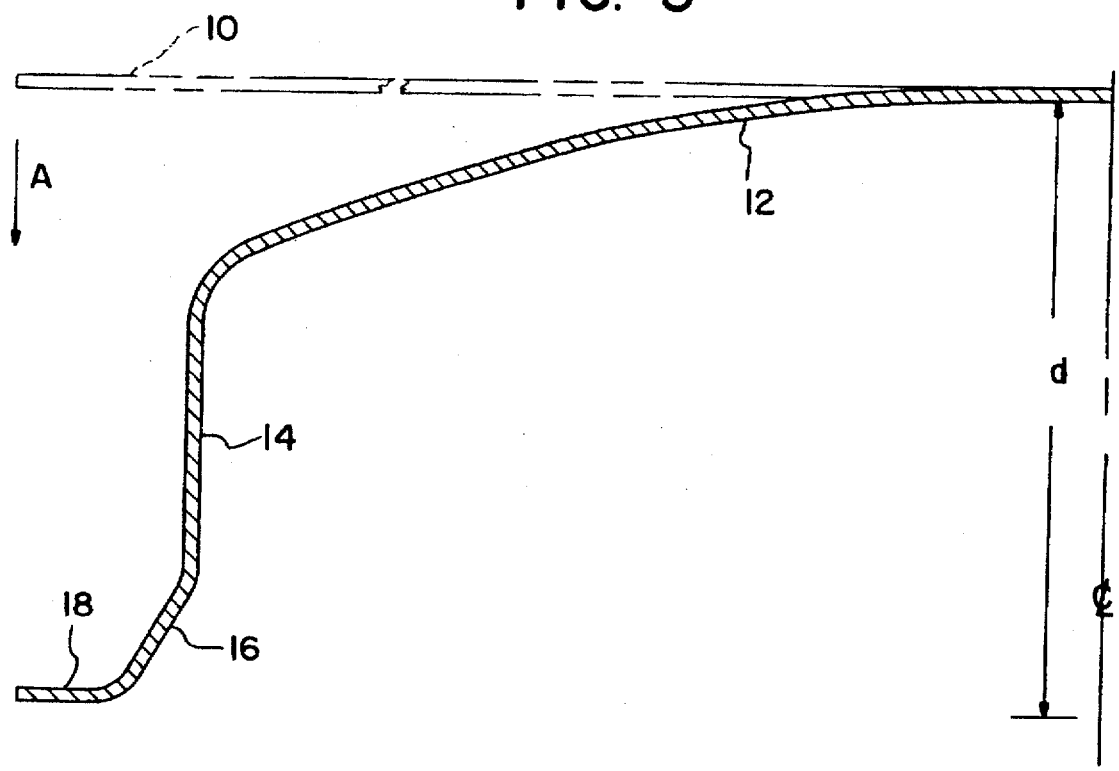
FIG. 3 is a half sectional view of a partially fabricated vehicle wheel illustrating the first step of the method of the present invention.

As shown in FIG. 3, a preferably circular and substantially flat metal blank, shown in phantom and indicated by reference number 10, is placed between the dies of the first station. A lower die member, or punch, is disposed below the blank 10. An annular upper tool, moving in a linear Vertical stroke fashion, draws the blank 10 over the punch in the axial direction A to form a circular, dish-shaped wall 12 and an outside wall which includes a generally cylindrical axial portion 14, which is generally parallel to the axial centerline of the wheel, an annular contour portion 16 protruding at an angle radially away from the axial portion 14, and an annular first side wall 18, extending generally perpendicularly to the axial centerline of the wheel for engaging one radially inward edge of a tire (not shown) to be mounted on the wheel. The first side wall 18 will form a portion of a rim for supporting the radially inward edges of a tire (not shown) to be mounted on the wheel.

Throughout this detailed description, the terms "upper" and "lower" are not intended to be limiting. They are used merely to describe a position relative to the vehicle wheel oriented as shown in the figures.

The radius of the blank 10, the radial distance between the centerline and the axial portion 14, and the radial width of the first side wall 18, as well as various other pertinent dimensions, will vary according to the desired dimensions of the finished wheel. The depth d of this first deep draw shown in FIG. 3 is preferably approximately 1⅝ times the desired finished rim width.

The lower die member, or punch, has a cross-sectional shape which corresponds to the shape of the dish-shaped wall 12 and the axial portion 14. The upper die member has a cross-sectional shape which corresponds to the contour portion 16 and the first side wall 18.

Figure 4:
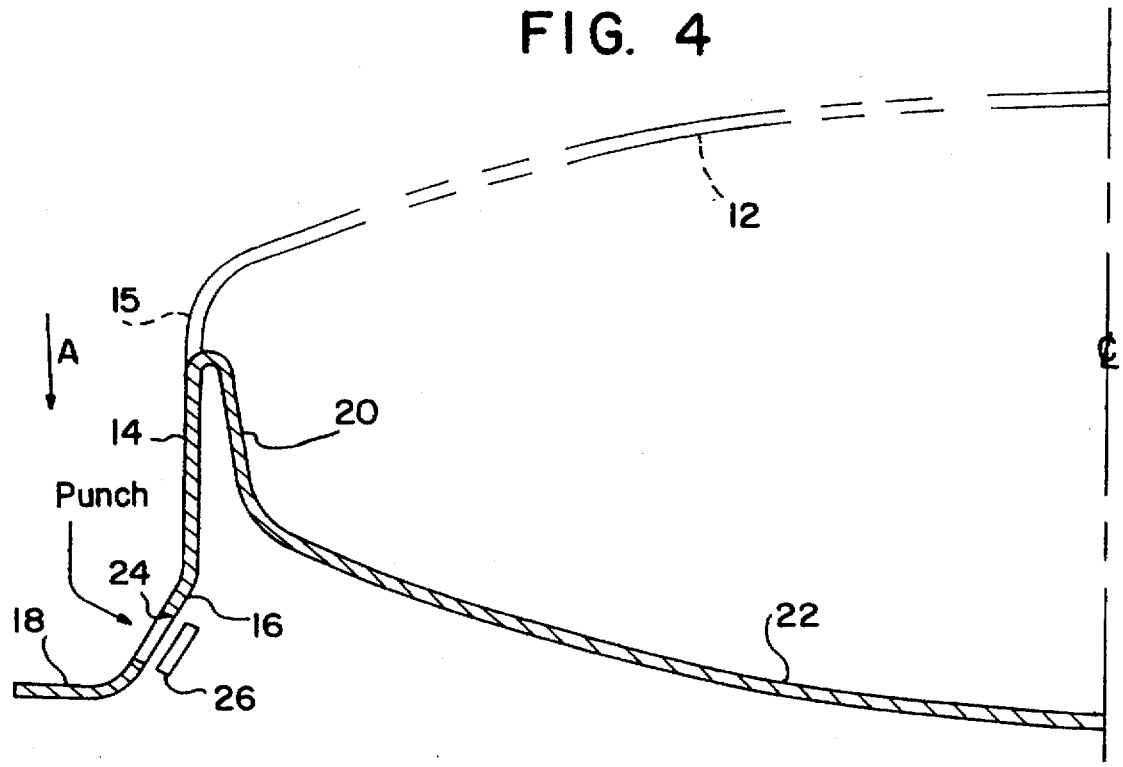
FIG. 4, is a half sectional view of a partially fabricated vehicle wheel illustrating the second step of the method of the present invention.

As shown in FIG. 4, in the second station of the method of the present invention, a central portion of the dish-shaped wall 12 is drawn in the axial direction A to construct the generally dome-shaped hub 22 of the wheel. An annular outer peripheral portion of the dish-shaped wall 12 is folded inside the axial portion 14, and an axial end portion 15 of the axial portion 14 is folded over itself to construct the inside wall 20 in annularly surrounding relation to the hub 22.

An upper punch member and a lower die member are provided. The dish-shaped wall 12 is drawn over the upper punch member by generating a relative vertical linear stroke motion between the lower die member and the upper punch member with the blank therebetween.

A punch, included as part of an upper die member, which may correspond to the upper punch member, is driven through the contour portion 16 at a specified circumferential position into a punch receiving die of the lower die member in a known manner, such as by the wedge action of interengaging annular surfaces, to remove a circular portion 26 from the contour portion 16 to fashion the valve hole 24. Following the hole punching operation, the punch is retracted into the upper die member, such as by a spring, to permit the upper die member to disengage from the lower die member.

The valve hole punching step has been described in conjunction with the second station of the method of the present invention as illustrated in FIG. 4. Due to the configuration of the forming and/or drawing punches and dies associated with each of the respective stations of the method of the present invention, there is sufficient room to perform the valve hole punching step in only a limited number of stations. Station 2 is the preferred station for performing the valve hole punching step. It will be understood, however, that the valve hole punching step may be performed in conjunction with other stations of the method, to be described below.

Figure 5:
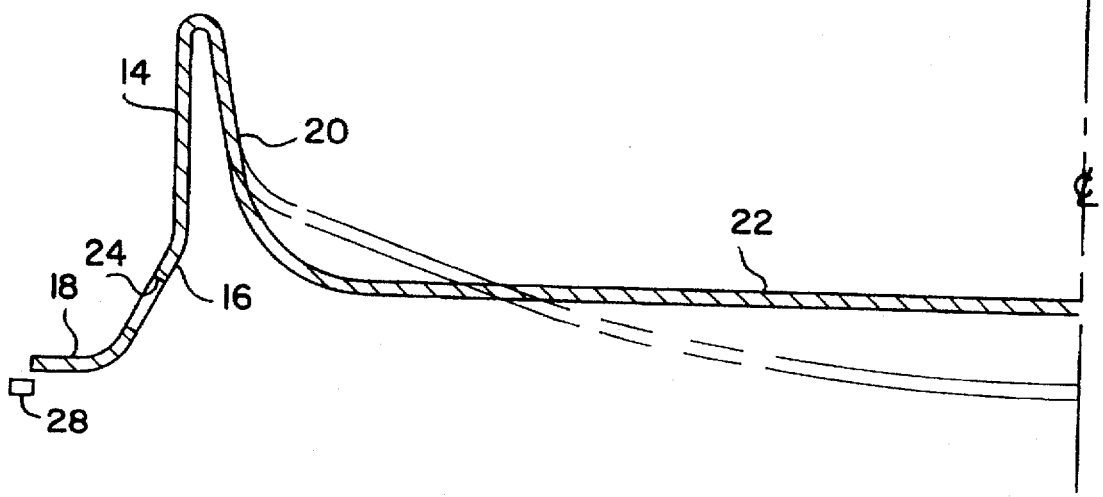
FIG. 5 is a half sectional view of a partially fabricated vehicle wheel illustrating the third step of the method of the present invention.

As shown in FIG. 5, the third station of the method of the present invention includes the step of flattening the hub 22 from the position shown in phantom to the position shown in cross-section so that it is substantially perpendicular to the centerline of the wheel. The hub is flattened by a stamping operation involving a linear vertical stroke motion between an upper punch member and a lower die member. Furthermore, in the third station illustrated in FIG. 5, an outer peripheral portion 28 of the first side wall 18 is trimmed to ensure a clean, substantially circular edge for the side wall 18. The trimming operating is preferably performed by a circular lower punch having an outside diameter corresponding to the desired outside diameter of the finished side wall and an annular upper cutting tool outwardly disposed from the lower punch member and movable with respect to the lower punch in coaxial fashion. In order to provide for the relative coaxial motion between the lower punch and the upper annular cutting tool, an annular clearance between the lower punch and the upper annular tool must be provided. It is presently preferred that the clearance be approximately 10% of the material thickness of the blank.

Figure 6:
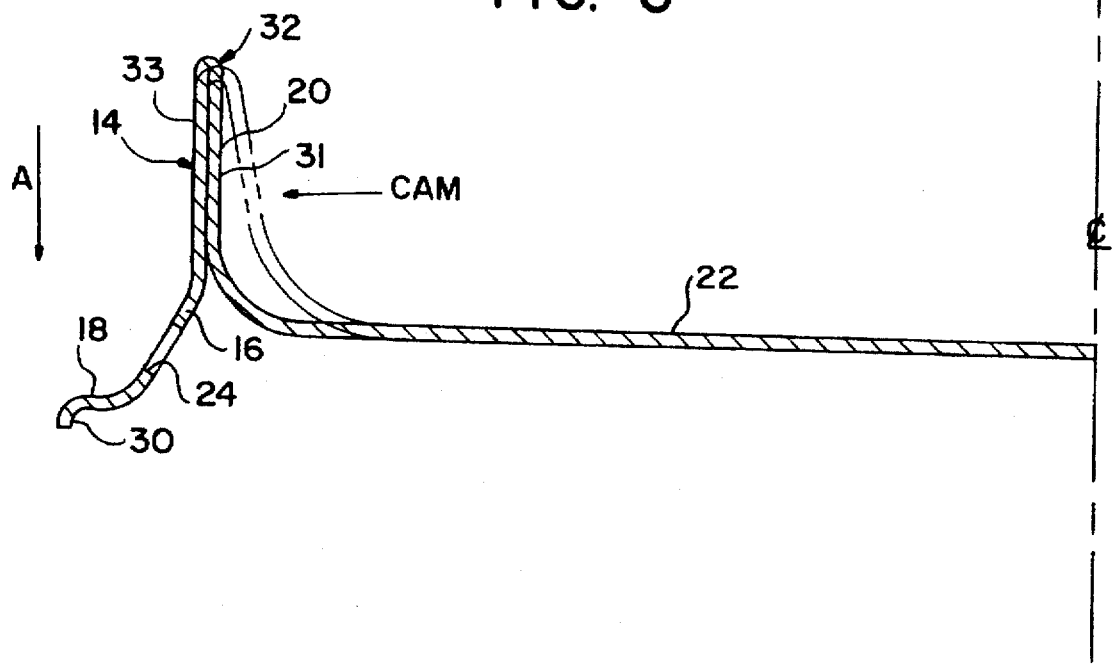
FIG. 6 is a half sectional view of a partially fabricated vehicle wheel illustrating the fourth step of the method of the present invention.

As shown in FIG. 6, in the fourth station of the method of the present invention, the inside wall 20 is drawn outwardly from the position shown in phantom to a position substantially parallel to and in contact with the axial portion 14 of the outside wall so as to construct a double walled axial portion 32. The double walled axial portion 32 includes an inner radial wall 31 and an outer radial wall 33.

Inside wall 20 is drawn radially outwardly by a cam action, horizontal stroke forming operation. The forming operation is performed by a conventional segmented expanding device. An upper die member, having a plurality of radially arranged sliding mandrel segments arranged about a central wedge member, is placed inside the inside wall 20 by a vertical linear stroke motion. A second upper die member, moving in vertical linear stroke fashion, forces the central wedge member downwardly causing the mandrel segments to move radially outwardly.

Also, in the station illustrated in FIG. 6, the outward peripheral edge of the first side wall 18 is wiped over to construct side wall stiffening flange 30. The wiping operation is performed by a lower punch having an outside diameter less than the overall diameter to the outward peripheral edge of the first side wall 18 and an upper annular die member relatively moveable in a coaxial fashion with respect to the lower punch member in a vertical linear stroke to wipe or fold the outer peripheral edge of the side wall 18 over the outer peripheral edge of the lower punch member.

Figure 7:
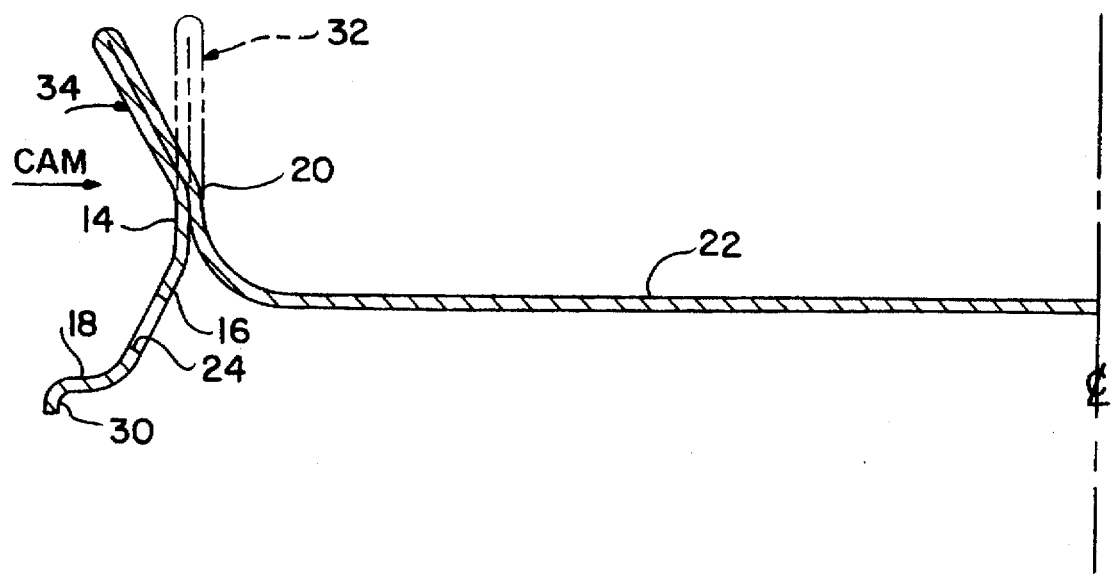
FIG. 7 is a half sectional view of a partially fabricated vehicle wheel illustrating the fifth step of the method of the present invention.

As shown in FIG. 7, in the fifth station of the method of the present invention, the double walled axial portion 32, shown in phantom, is bent radially outwardly to form the second contour 34 protruding at an angle radially away from the axial portion 14. Second contour 34 is preferably formed by an inner die member disposed within the inside wall 20 of the wheel and having a plurality of radially arranged outwardly slidable inner mandrel segments arranged about a central wedge and an outer die member disposed annularly about the periphery of the wheel and having a plurality of radially arranged inwardly slidable outer mandrel segments. As discussed above with respect to FIG. 6, the inner mandrel segments are moved radially outwardly by the action of a wedge member moving vertically. The outer mandrel segments are moved radially inwardly by the action of a cam or wedge ring moving vertically.

Figure 8:
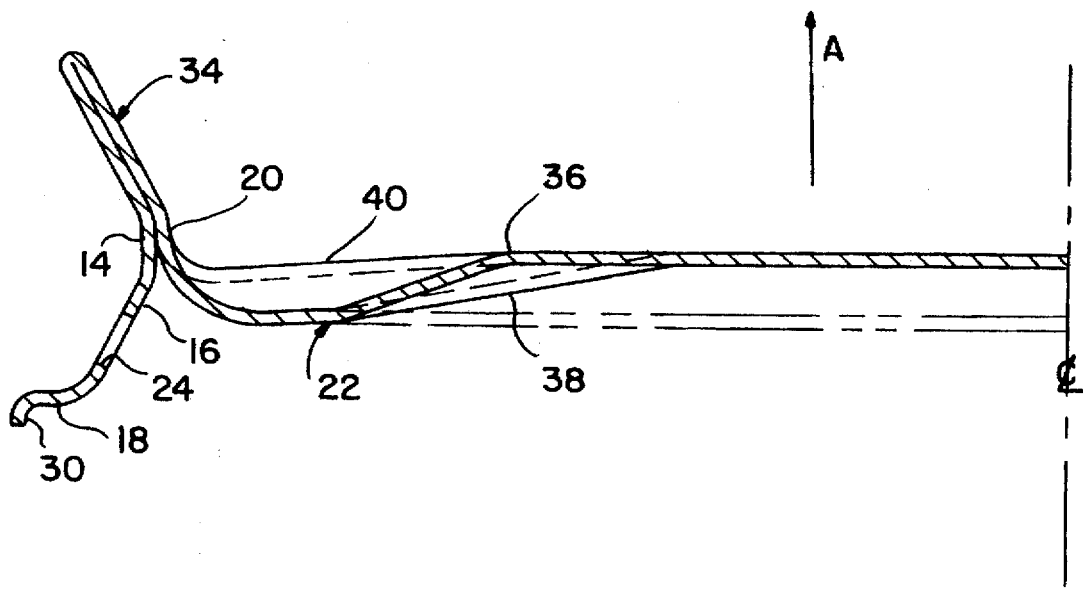
FIG. 8 is a half sectional view of a partially fabricated vehicle wheel illustrating the sixth step of the method of the present invention.

As shown in FIG. 8, in the sixth station of the method of the present invention, a circular central portion of the hub 22 is drawn in the axial direction A to construct a first offset 36 of the hub 22 offset 36 is preferably formed by means of an upper die member and a lower punch member having a size corresponding to the size of the first offset 36, as shown in FIG. 8.

Also in station six, a plurality of inner hub stiffening embosses 38 and outer hub stiffening embosses 40 are stamped into the hub 22. The hub-stiffening embosses are circumferentially spaced and radially arranged in surrounding relation to the centerline of the wheel, the inner hub-stiffening embosses 38 being radially closer to the centerline and the outer hub-stiffening embosses 40 being further radially remote from the centerline.

The inner hub-stiffening embosses 38 are preferably formed by an upper punch member and a lower die member, the upper punch member moving with respect to the lower die member in vertical linear stroke fashion. The upper punch member has a plurality of radially arranged circumferentially spaced inner mandrel portions which are received by associated radially arranged circumferentially spaced inner mandrel receiving portions of the lower die member. When the upper die member engages the wheel, each inner mandrel portion of the upper die member shapes a portion of the hub by forcing a portion of the hub into a corresponding mandrel receiving portion of the lower die member.

The outer hub stiffening embosses 40 are preferably formed by a lower punch member and an upper die member, the lower punch member moving with respect to the upper die member in vertical linear stroke fashion. The lower die member has a plurality of radially arranged circumferentially spaced outer mandrel portions that are received by associated radially arranged circumferentially spaced mandrel receiving portions of the upper punch member. When the lower die member engages the wheel, each outer mandrel portion of the lower die member shapes a portion of the hub by forcing a portion of the hub into a corresponding mandrel receiving portion of the upper die member.

The number of inner hub stiffening embosses 38 and outer hub stiffening embosses 40 each preferably corresponds to the number of wheel mounting holes, to be discussed below.

Because station six involves no other tool members disposed about the outside periphery of the partially fabricated wheel, a hole-punching die member disposed around about the periphery of the wheel could be used in this station. Therefore, the valve hole 24 punching step, discussed above in conjunction with station two of the preferred embodiment (see FIG. 4), could alternatively be performed at station six.

Figure 9:
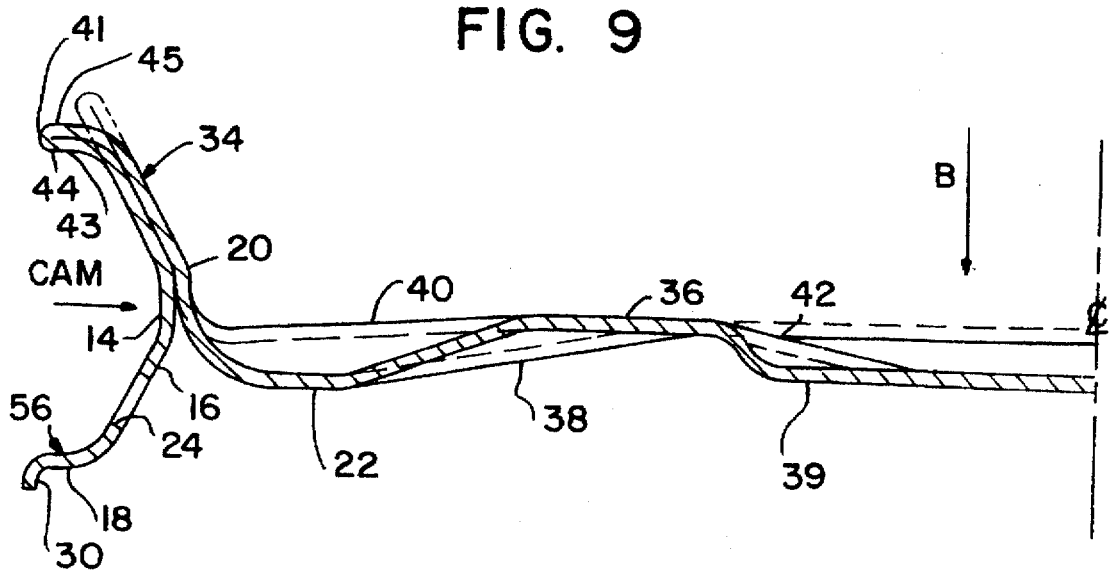
FIG. 9 is a half sectional view of a partially fabricated vehicle wheel illustrating the seventh step of the method of the present invention.

As shown in FIG. 9, at the seventh station of the method of the present invention, a central portion of the first offset 36 of the hub 22 is drawn in the axial direction B to construct a second offset 42 of the hub 22. The second offset 42 is preferable drawn by an appropriate upper punch member having a radius corresponding to the desired radius of the second offset 42, and an appropriate lower die member.

Also at the seventh station, a plurality of circumferentially spaced sockets 39 are formed in the area of the second offset 42. The sockets 39 are radially arranged in surrounding relation to the centerline of the wheel.

Also at station seven, the outer peripheral portion of the second contour 34 is bent radially outwardly to a position substantially perpendicular to the centerline of the wheel to construct the second side wall 44 for engaging the other radially inward edge of a tire to be mounted on the wheel, thus substantially completing the fabrication of a tire engaging rim 56 around the periphery of the wheel. The second side wall 44 includes inner rim wall 43, outer rim wall 45, and a curved segment 41 integrally connecting the inner rim wall 43 and the outer rim wall 45.

The second side wall 44 is preferably formed by an appropriate upper die member and an outer die ring disposed about the periphery of the wheel and having a plurality of radially arranged inwardly sliding outer mandrel segments, which are moved radially inwardly by the action of a cam or wedge ring moving vertically.

Finally, at the seventh station of the method of the present invention, a reshaping, or restriking, operating is preferably performed on the first offset 36, the inner hub stiffening embosses 38, and the outer hub stiffening embosses 40 to ensure that each of these features is sized correctly.

Figure 10:
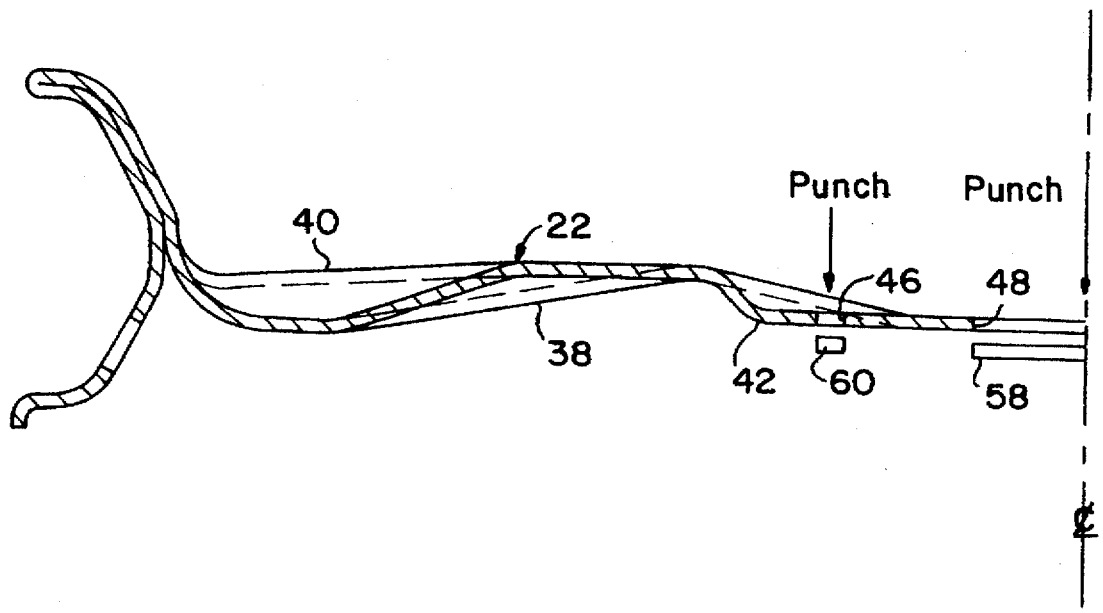
FIG. 10 is a half sectional view of a partially fabricated vehicle wheel illustrating the eighth step of the method of the present invention.

As shown in FIG. 10, at the eighth station of the method of the present invention, a circular disk portion 58 is removed, as by a punch operation, from the center of the hub 22 to fashion a center aperture 48. In addition, a plurality of circular disk portions 60 of the hub 22 are removed, as by punch operations, from the hub 22 to fashion a plurality of wheel mounting holes 46 disposed within the sockets 39 in a surrounding relationship to the center aperture 48. The center aperture 48 and the plurality of wheel mounting holes 46 are preferably fashioned by a conventional upper punch member and a lower die member, the upper punch member being moved in a vertical linear stroke manner into the lower die member to remove the material to fashion the center aperture 48 and the plurality of wheel mounting holes 46. The number of wheel mounting holes 46 preferably corresponds to the number of inner hub stiffening embosses 38 and the number of outer hub stiffening embosses 40, and vice versa. The actual number of wheel mounting holes typically varies from 4 to 6 holes.

Because station eight involves no tool members disposed about the outside periphery of the partially fabricated wheel, a hole-punching die member disposed about the periphery of the wheel could be used in this station. Therefore, the valve hole 24 punching step, discussed above in conjunction with station two of the preferred embodiment (see FIG. 4), could alternatively be performed at station 8.

Figure 11:
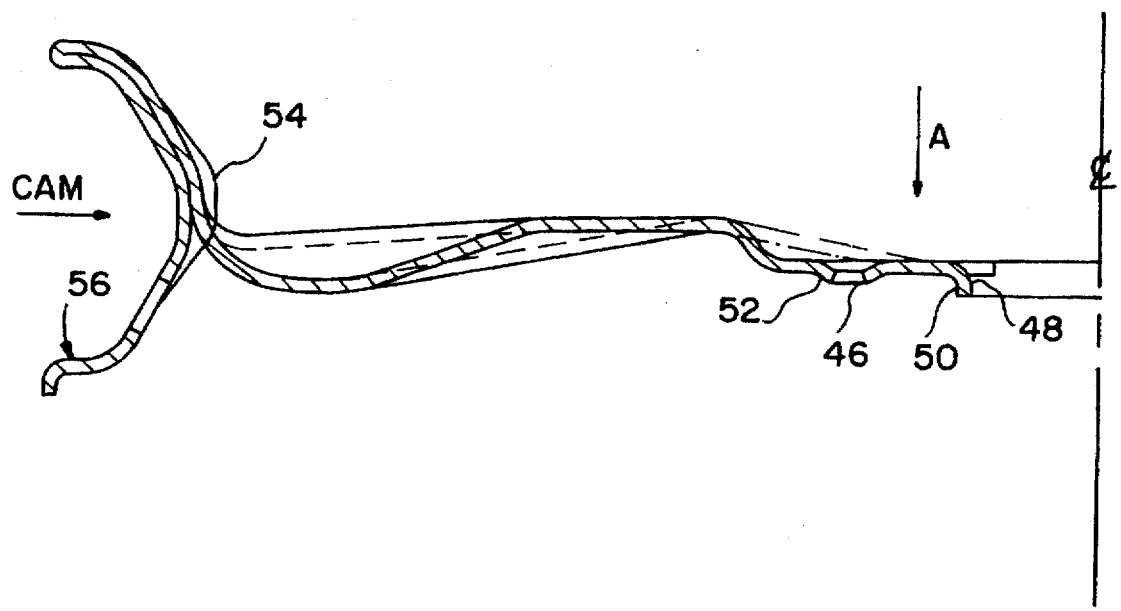
FIG. 11 is a half sectional view of a completed vehicle wheel illustrating the ninth step of the method of the present invention.

As shown in FIG. 11, in a ninth station of the method of the present invention, a peripheral edge of the center aperture 48 is extruded in the axial direction A to construct an aperture stiffening flange 50 around the periphery of the center aperture 48. Also, a peripheral portion of each of the plurality of wheel mounting holes 46 is extruded in the axial direction A to construct a hole stiffening flange 52 around the periphery of each of the wheel mounting holes 46. The hole stiffening flange 52 also serves to center a wheel mounting bolt (not show), which may have a frusto-conical surface for engaging the flange 52, when the bolt is inserted through the hole.

Finally, a plurality of rim stiffening embosses 54 are formed in the rim 56 by deforming portions of the rim 56 radially inwardly. The rim stiffening embosses 54 are substantially axially centered on the rim 56 and are circumferentially spaced about the periphery of the rim 56. The rim stiffening embosses 54 are preferably formed by an outer die member disposed around the outer periphery of the wheel and having a plurality of circumferentially spaced radially arranged inwardly slidable mandrel segments, which are moved radially inwardly by the action of a cam or wedge ring moving vertically.

A wheel fabricated by the method of the present invention preferably is constructed of a high strength material, such as 1010 steel or 1080 steel, and preferably has a material thickness ranging from 0.120" to 0.140".

The method of the present invention has been described in terms of the preferred sequence of fabrication stations and the preferred steps to be performed at each station. The sequence of stations, and the steps performed at each station may, to some extent, deviate from the preferred embodiment described herein. Due to spatial and other limitations, however, there are certain steps which may be performed only at specific stations. An example of such a step is the valve hole punching step, described above, which may feasibly be performed only at stations two, six, or eight. It is also preferred that certain combinations of steps not be performed at the same station. For example, lateral forming steps, such as those performed at stations four, five seven, and nine should not be performed at a station where cutting or punching steps are performed, such as at stations two, three, and eight. This is because lateral forming operations can cause the partially fabricated wheel to shift laterally, which can result in misalignment of punches and dies and misplacement of cuts or punched holes. It is preferable that cutting and punching operations be combined with vertical drawing steps.

It will be realized that the foregoing preferred specific embodiment of the method of the present invention has been shown and described for the purpose of illustrating the functional and structural principles of this invention and is subject to change without departure from such principles. Therefore, this invention includes all modifications encompassed within the spirit and scope of the following claims.

What is claimed is:

1. A method of forming a metal, one piece vehicle wheel for supporting a tire thereon, said wheel having an axial centerline, a rim for mounting radially inward edges of the tire, and a hub for supporting the wheel on a vehicle, said method comprising:

(1) providing a sheet metal blank and shaping said blank in a first axial direction to construct a dish-shaped wall and to construct an outside wall and a first side wall of said rim for supporting one of the radially inward edges of the tire to be mounted, said outside wall including an axial portion generally parallel to said axial centerline, and a first contour portion extending from said axial portion of said outside wall to said first side wall;

(2) shaping a central portion of said dish-shaped wall in a second axial direction to construct said hub in a generally dome shape and to fold an annular radially outward portion of said dish-shaped wall inside said outside wall to construct an inside wall in surrounding relation to said hub, and piercing a valve hole in said first contour portion to receive a tire valve stem;

(3) flattening said hub and trimming an outer peripheral portion of said first side wall;

(4) shaping said inside wall radially outwardly so that an extent of said inside wall is parallel to and in contact with said axial portion of said outside wall to construct a double walled axial portion and shaping an outer peripheral edge of said side wall to construct a first side wall stiffening flange;

(5) shaping a portion of said double walled axial portion radially outwardly to construct a second contour portion of said rim;

(6) shaping a portion of said hub in the first axial direction to construct a first offset constructed and arranged to stiffen said hub and shaping a plurality of circumferentially spaced hub-stiffening embosses in said hub, said plurality of hub-stiffening embosses being radially arranged in surrounding relation to the centerline of the wheel;

(7) shaping said first offset in the second axial direction to construct a second offset constructed and arranged to further stiffen said hub and to construct a plurality of circumferentially spaced sockets radially arranged in surrounding relation to the centerline of the wheel and shaping a portion of said second contour to construct a second side wall for supporting the radially inward edge of the tire to be mounted;

(8) piercing a center hole and a plurality of wheel mounting holes surrounding said center hole in said hub, each of said plurality of wheel mounting holes being formed in a corresponding one of said plurality of sockets; and (9) shaping a plurality of circumferentially spaced rim-stiffening embosses in said rim and shaping said center hole and each of said plurality of wheel mounting holes to construct a center hole flange for said center hole and a wheel mounting hole flange for each of said plurality of wheel mounting holes.

2. The method of claim 1 further comprising reshaping said first offset and said plurality of hub-stiffening embosses to ensure that said first offset and said plurality of hub-stiffening embosses are sized correctly.

3. The method of claim 1 wherein said shaping a plurality of hub-stiffening embosses step includes shaping a plurality of inner hub-stiffening embosses, disposed at a radially inward portion of said hub, and shaping a plurality of outer hub-stiffening embosses, disposed at a radially outward portion of said hub.

4. The method of claim 3 wherein said plurality of wheel mounting holes corresponds in number to said plurality of inner hub-stiffening embosses and to said plurality of outer hub-stiffening embosses.

5. The method of claim 1 wherein said shaping a plurality of inner hub stiffening embosses step and said shaping a plurality of outer hub stiffening embosses step are performed by a first die member, having a plurality of radially arranged circumferentially spaced inner mandrel portions and a plurality of radially arranged circumferentially spaced outer mandrel receiving portions, the plurality of outer mandrel receiving portions of the first die member being disposed radially outwardly from the inner mandrel portions of the first die member, and a second die member having a plurality of radially arranged circumferentially spaced inner mandrel receiving portions adapted to receive associated inner mandrel portions of the plurality of inner mandrel portions of the first die member and a plurality of radially arranged circumferentially spaced outer mandrel portions to be received by associated mandrel receiving portions of the plurality of mandrel receiving portions of the first die member, said inner and outer hub stiffening embosses being formed by a relative stamping motion between the first die member and the second die member.

6. The method of claim 1 wherein said sheet metal blank comprises high strength steel.

7. The method of claim 6 wherein said high strength steel is 1010 steel.

8. The method of claim 6 wherein said high strength steel is 1080 steel.

9. The method of claim 1 wherein said sheet metal blank has a thickness ranging from 0.120 inches to 0.140 inches.

10. The method of claim 1 wherein said shaping said blank in a first axial direction step is performed substantially by a punch disposed adjacent the sheet metal blank and an annular tool, the annular tool moving in a linear vertical stroke fashion to draw the blank over the punch in the first axial direction, the punch having a cross sectional shape corresponding to a shape of said dish-shaped wall and the annular tool having a cross sectional shape corresponding to a shape of said contour portion and said first side wall.

11. The method of claim 1 wherein said shaping a central portion of said dish-shaped wall in a second axial direction step is performed by a first punch member and a second punch member, said dish shaped wall being drawn over the first punch member due to a relative vertical linear stroke motion between the first and second punch members with the dish shaped wall disposed therebetween.

12. The method of claim 11 wherein said valve hole piercing step is performed by a punch, included as a component of a first die member, driven through said contour portion into a punch receiving die of a second die member.

13. The method of claim 1 wherein said shaping said inside wall radially outwardly and said hub flattening steps are performed by a stamping operation involving a linear vertical stroke motion between a punch member and a die member.

14. The method of claim 1 wherein said trimming an outward peripheral portion of said first side wall step is performed by providing a circular punch having an outer diameter corresponding to a desired outside diameter of said side wall, and an annular cutting tool outwardly disposed from the punch member and moveable with respect to the punch member in a coaxial fashion.

15. The method of claim 1 wherein said further shaping of said inside wall step is performed by a segmented expanding device, including a plurality of radially arranged sliding mandrel segments arranged about a central wedge member and moveable radially outwardly by a vertical linear stroke motion of the central wedge member.

16. The method of claim 1 wherein said shaping an outward peripheral edge of said side wall step is performed by providing a punch member having an outside diameter less than an overall diameter of the first side wall and an annular die member relatively moveable in a coaxial fashion with respect to the punch member in a vertical linear stroke to wipe an outward peripheral edge of said side wall over an outer peripheral edge of the lower punch member.

17. The method of claim 1 wherein said shaping a portion of said double-walled axial portion radially outwardly step is performed by an inner segmented expanding device, having a plurality of radially arranged sliding mandrel segments arranged about a central wedge member, the mandrel segments being moveable radially outwardly by the vertical linear stroke motion of the central wedge member, and an outer segmented die member disposed annularly about the periphery of the wheel and having a plurality of radially arranged inwardly slidable outer mandrel segments, the outer mandrel segments being radially inwardly moveable by a linear vertical stroke motion of a wedge ring.

18. The method of claim 1 wherein said shaping a portion of said hub in said first axial direction step is performed by a die member and a punch member, the punch member having a size corresponding to a size of said first offset, the die member and punch member being moveable with respect to each other in a vertical linear stroke motion to draw a central portion of said hub over the lower punch member.

19. The method of claim 1 wherein said shaping said first offset in said second axial direction step is performed by a die member and a punch member, the punch member having a size corresponding to a size of said second offset, the die member and the punch member being moveable with respect to each other in a vertical linear stroke motion to draw a central portion of said first offset over the punch member.

20. The method of claim 1 wherein said shaping a portion of said second contour to construct a second side wall step is performed by an outer segmented die member disposed annularly about the periphery of the wheel and having a plurality of radially arranged inwardly slidable outer mandrel segments, the outer mandrel segments being radially inwardly moveable by a linear vertical stroke motion of a wedge ring, and a punch member moveable in the axial direction to form a portion of said second contour over said plurality of radially arranged inwardly slidable outer mandrel segments to form said second side wall.

21. The method of claim 1 wherein said piercing a center hole step is performed by a first punch moving vertically through said hub into a first punch receiving die and said piercing a plurality of wheel mounting holes step is performed by a second punch member radially removed from the center line of the wheel, the second punch member moving vertically through said hub into a second punch receiving die.

22. The method of claim 1 wherein said shaping a plurality of rim stiffening embosses step is performed by an outer die member disposed about the outer periphery of the wheel and having a plurality of circumferentially spaced radially arranged inwardly slidable mandrel segments, said mandrel segments being movable radially inwardly by a vertical motion of a wedge ring.

* * * * *